E. CONERWAY.
RAIL JOINT.
APPLICATION FILED APR. 10, 1915.
1,153,606.
Patented Sept. 14, 1915.
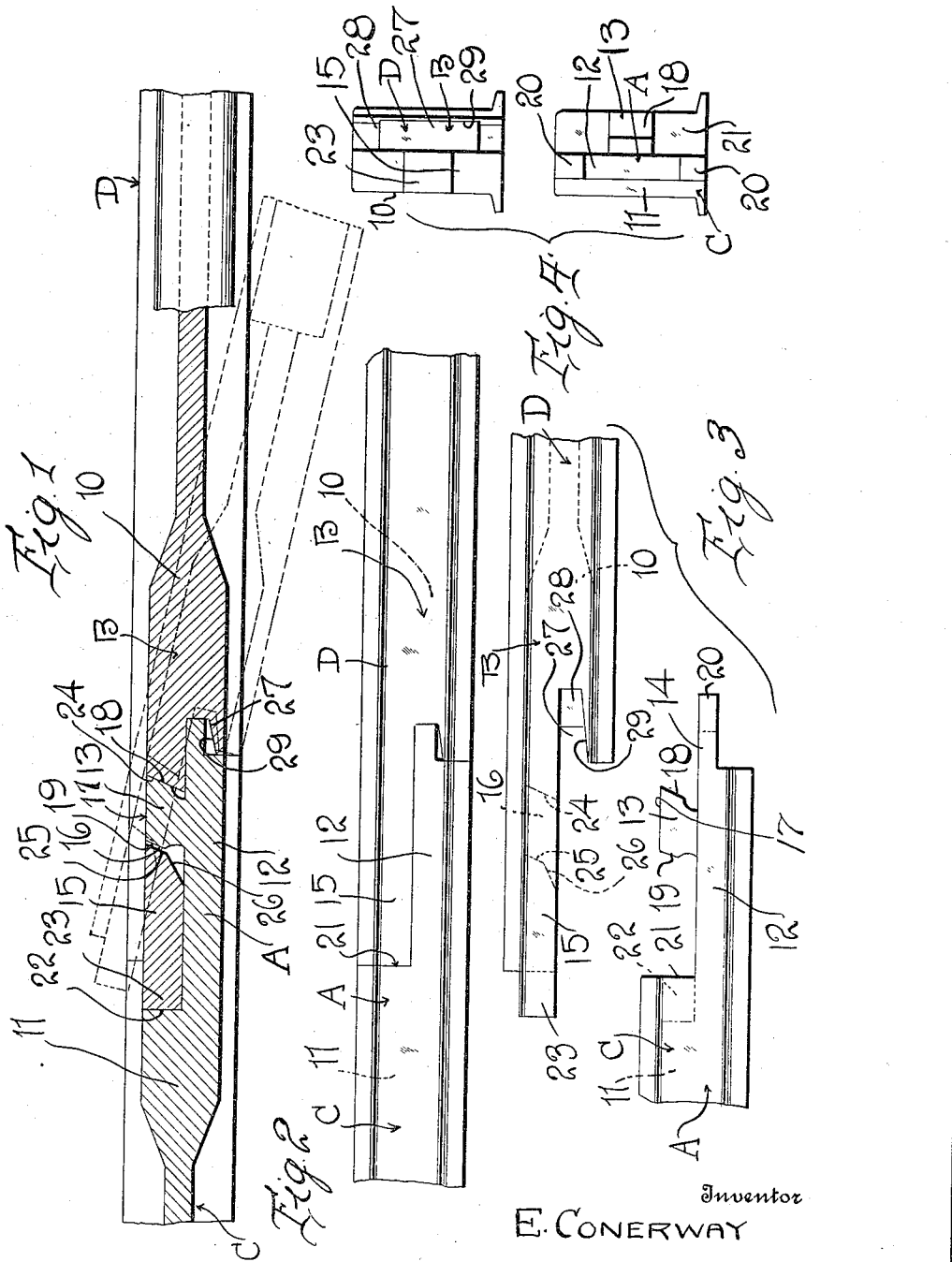
Inventor
E. CONERWAY
By Watson E. Coleman
Attorney

UNITED STATES PATENT OFFICE.

EDCOR CONERWAY, OF ATWOOD, TENNESSEE.

RAIL-JOINT.

1,153,606. Specification of Letters Patent. Patented Sept. 14, 1915.

Application filed April 10, 1915. Serial No. 20,543.

*To all whom it may concern:*

Be it known that I, EDCOR CONERWAY, a citizen of the United States, residing at Atwood, in the county of Gibson and State of Tennessee, have invented certain new and useful Improvements in Rail-Joints, of which the following is a specification, reference being had to the accompanying drawings.

The present invention relates to new and useful improvements in rail joints and as its principal object aims to provide a joint which is relatively simple in design and may, therefore, be cheaply manufactured and is so constructed that the meeting sections of the rail will be securely connected and held against separation under longitudinal or lateral thrust.

A further and more specific object of the invention is to provide a rail joint which consists essentially in a male element formed on the terminal of one rail and a female element formed on the terminal of the next adjacent rail, the two elements being adapted to mate.

The above, and other incidental objects of a similar nature, which will be hereinafter more specifically treated, are accomplished by such means as are illustrated in the accompanying drawings, described in the following specification, and then more particularly pointed out in the claims which are appended hereto and form part of this application.

With reference to the drawings, wherein there has been illustrated the preferred embodiment of this invention, as it is reduced to practice, and throughout the several views of which similar reference numerals designate corresponding parts, Figure 1 is a view partly in horizontal section and partly in top plan showing the male and female elements, in coupled relation; Fig. 2 is a top plan view of the joint; Fig. 3 is a composite view showing the elements of the joint in top plan view and in dis-assembled relation to each other; Fig. 4 is a composite view showing the meeting terminals of the joint in end elevation.

As embodied in the accompanying drawings, the joint includes two co-acting joint plates generally designated A and B, which members are respectively formed on the meeting terminals of the rails C and D. The webs of the rails C and D are transversely thickened, as indicated at 10 and 11. The members A and B extend longitudinally from the enlarged portions 10 and 11 and the rail webs and are in thickness approximately one-half the thickness of the enlarged portions, so that they, (the members A and B), when mated, form in effect a continuation of the members 10 and 11.

The joint plate A includes the body plate 12, which extends longitudinally from the portion 11, a lateral locking stud 13, which extends in a horizontal plane and diagonally with respect to the base of the member 12, and a locking tongue 14. The locking stud 13 is adapted to be inserted in an opening formed in the body plate 15 of the joint member B, as indicated by dotted lines in Fig. 4, at 16. The outer face 17 of the stud extends in parallel relation to the longitudinal faces of the joint plate 12, while the side faces 18 and 19 of the stud extend in parallel relation to each other and diagonally with respect to the face 17. The purpose in thus shaping the stud will be hereinafter more fully explained.

Extending longitudinally from the tongue 14, which member is approximately one-half the thickness of the joint plate 12, are a pair of vertically spaced lugs 20 which are adapted to engage in recesses formed in the end of the enlarged portion 10 of the rail D, as will be hereinafter set forth. In the terminal 21 of the enlarged portion 11 of the web of the rail C, is formed a recess indicated at 22, in Figs. 1 and 3.

The section B of the joint includes the body or joint plate heretofore designated by the numeral 15 and the locking tongue 23 which member extends longitudinally from the outer end of the member 15. In the joint plate 15, is formed the opening heretofore designated by the numeral 16. The rear wall of this opening indicated at 24 extends diagonally with respect to the faces of the member 15 and is engaged by the diagonal face 18 of the locking stud 13 when the joint is assembled. The front wall 25 of the opening 16 extends in parallel relation to the wall 24 and is engageable by the face 19 of the stud 13 when the joint is assembled. The forward wall of the opening 16 is chamfered at its inner end to form the angular face or shoulder 26. This shoulder 26 extends at an obtuse angle to the face 25 and at an approximate angle of 45° to the side faces of the joint plate 15. The shoulder 26 acts as a bearing surface upon which the end face 17 of the locking stud slides when the joint is being assembled.

In the forward end of the enlarged portion 10 of the web of the rail D is formed a recess 27 which is adapted to receive the locking tongue 14. Additional recesses indicated at 28 are formed in the upper and lower faces of the member 10 and in communication with the recess 27 for the reception of the lugs 20 of the locking tongue 14. The outer wall 29 of the recess 27 extends diagonally with respect to the adjacent face of the joint plate 15 and is directed inwardly and rearwardly, as best shown in Figs. 1 and 3.

The actual construction and arrangement of the several elements of the joint being thus described, it now remains to explain the manner in which the joint is assembled. In this connection, reference will now be had particularly to Fig. 1, in which the initial relation of the joint elements A and B is indicated in dotted lines. It will be seen that the rails C and D are disposed at an acute angle to each other with the outer face 17 of the locking stud 13 engaging against the angular shoulder 26 of the joint member B and with the lugs 20 projecting into the recesses 28. The rails C and D are then moved toward each other, the locking stud 13 riding over the shoulder 26 until it is projected through the opening 16, with its outer face lying flush with the outer face of the joint plate 15, as in Fig. 1. When the locking stud 13 has been thus disposed the lugs 20 are seated in the recesses 28 and the locking tongue 14 is seated in the recess 27. It is to be observed that the tongue 14 rides on the diagonal wall 29 of the recess 27 when the joint is being assembled and that it is necessary for this reason to direct the wall 29 obliquely. When the joint has been assembled, as shown in Fig. 1, the locking tongue 23 seats in the receiving recess 22 of the member 11. It is now to be observed that the stud 13 by engagement with the front and rear walls 25 and 24 of the opening 16, serves to hold the rail sections against longitudinal separation; that the locking tongues 14 and 23, together with the lugs 20 are disposed to resist any vertical turning of the rail terminals about the stud 13 as an axis; and that these members further resist any lateral thrust exerted in the direction of the outside of the rail.

In reduction to practice, it has been found that the form of this invention illustrated in the drawings, and referred to in the above description as the preferred embodiment is the most efficient and practical; yet realizing that the conditions concurrent with the adoption of this device will necessarily vary, it is desirable to emphasize the fact that various minor changes in the details of construction, proportion and arrangement of parts may be resorted to, when required, without sacrificing any of the advantages of this invention, as defined by the appended claims.

What is claimed is:—

1. The combination with meeting rail terminals of a joint including a pair of co-acting joint plates formed integrally with the rail terminals, one of said joint plates being provided with an opening, a transverse locking stud formed on the other locking plate and insertible in said opening, said stud acting to hold the rail terminals against longitudinal movement with respect to each other, and co-acting locking tongues formed on the terminals of the joint plates, there being receiving recesses for these tongues in the terminals of the web portions of the meeting rail ends, said tongues being disposed in said recesses for holding the rail terminals against turning movement about the studs as an axis in both vertical and horizontal planes.

2. The combination with abutting rail terminals having their web portions transversely enlarged, of a joint including a pair of joint plates extending longitudinally from the enlarged portions of the rail webs, said joint plates being adapted to mate, forming a continuation of the enlarged web portions, a locking stud formed on one joint plate and insertible through the other joint plate for holding the rails against longitudinal movement, a locking tongue extending longitudinally from the first mentioned joint plate, there being a recess in the enlarged web portion of the rail carrying the second mentioned joint plate, said tongue being inserted in said recess, there being additional recesses formed in communication with the upper and lower terminals of said first mentioned recess, longitudinally extending lugs formed on said locking tongue and seated in said second mentioned recesses, and a longitudinally extending locking tongue formed on the second mentioned joint plate, there being a receiving recess formed in the enlarged web portion of the rail which carries the first mentioned joint plate, said last mentioned locking tongue being seated in said last mentioned recess.

3. The combination with meeting rail terminals of a joint including a pair of co-acting joint plates formed integrally with the rail terminals, one of said joint plates being provided with a transverse opening, there being recesses formed in the web portion of each rail adjacent the inner end of the joint plate thereof, a transverse locking stud carried by one joint plate and insertible through the opening in the other joint plate, and longitudinal locking tongues projecting from the outer end of each joint plate, said tongues being seated in said recesses, one of said tongues being adapted to prevent the turning of the joint plates about the stud in a vertical plane and the other of said tongues being adapted to hold the joint plates against turning in a horizontal plane.

4. The combination with meeting rail terminals of a joint, including a pair of co-acting joint plates formed integrally with the rail terminals, one of said joint plates being provided with a transverse opening, the vertical walls of which extend diagonally with respect to the longitudinal axis of the joint plate, and a transverse locking stud extending from the side face of the other joint plate and at an acute angle thereto, the opposed vertical faces of said stud being parallel and being adapted to engage against the vertical walls of said openings in the first mentioned joint plate.

In testimony whereof I hereunto affix my signature in the presence of two witnesses.

EDCOR $\overset{\text{his}}{\underset{\text{mark}}{\times}}$ CONERWAY.

Witnesses:
F. J. Crocker,
M. V. Akin.

Copies of this patent may be obtained for five cents each, by addressing the "Commissioner of Patents, Washington, D. C."